US012782935B2

(12) United States Patent
Du et al.

(10) Patent No.: US 12,782,935 B2
(45) Date of Patent: Nov. 3, 2026

(54) HAPTIC SYSTEM FOR ROBOT TELEOPERATION OF A REMOTELY OPERATED VEHICLE

(71) Applicant: UNIVERSITY OF FLORIDA RESEARCH FOUNDATION, INCORPORATED, Gainesville, FL (US)

(72) Inventors: Jing Du, Gainesville, FL (US); Pengxiang Xia, Gainesville, FL (US); Fang Xu, Gainesville, FL (US); Qi Zhu, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 225 days.

(21) Appl. No.: 18/343,095

(22) Filed: Jun. 28, 2023

(65) Prior Publication Data

US 2024/0012412 A1 Jan. 11, 2024

Related U.S. Application Data

(60) Provisional application No. 63/368,074, filed on Jul. 11, 2022.

(51) Int. Cl.

| | |
|---|---|
| ***G05D 1/00*** | (2024.01) |
| ***B63C 11/52*** | (2006.01) |
| ***B63G 8/00*** | (2006.01) |

(52) U.S. Cl.
CPC .............. *G05D 1/005* (2013.01); *B63C 11/52* (2013.01); *B63G 8/001* (2013.01); *G05D 1/0038* (2013.01);

(Continued)

(58) Field of Classification Search
CPC .... G05D 1/005; G05D 1/0038; G05D 1/0206; G05D 1/2245; G05D 2105/47;

(Continued)

(56) References Cited

U.S. PATENT DOCUMENTS 4,302,138 A * 11/1981 Zarudiansky .............. B25J 3/04 414/730
4,721,055 A * 1/1988 Pado ...................... B63G 8/001 405/188

(Continued)

OTHER PUBLICATIONS

Xia, Pengxiang, et al., "ROV Teleoperation via Human Body Motion Mapping: Design and Experiment", *Computers in Industry*, vol. 150, (15 pages), May 31, 2023, https://doi.org/10.1016/j.compind.2023.103959.

(Continued)

*Primary Examiner* — Tyler J Lee
*Assistant Examiner* — Matthew John Moscola
(74) *Attorney, Agent, or Firm* — Alston & Bird LLP

(57) ABSTRACT

A system, apparatus, and method are provided herein for remote control of a robotic device, and more particularly, to a haptic system for robot teleoperation. A system for robot teleoperation is provided including: an underwater robot vehicle; a subsea sensing module associated with the underwater robot vehicle; a workplace module; and a user interface, where the subsea sensing module senses an environment of the underwater robot vehicle and provides sensor data to the workplace module, where the workplace module reproduces the environment and instructs the user interface to provide sensory augmentation associated with the environment to an operator. The system of an example embodiment further includes a robot control module, where the user interface receives input from the operator and the robot control module controls the underwater robot vehicle according to the input.

19 Claims, 5 Drawing Sheets

(52) U.S. Cl.
CPC ..... *B63G 2008/005* (2013.01); *G05D 1/0206* (2013.01)

(58) Field of Classification Search
CPC ........... G05D 2107/27; G05D 2109/38; G05D 1/2242; B63C 11/52; B63G 8/001; B63G 2008/005; G06F 3/011; G06F 3/012; G06F 3/014; G06F 3/016; G06F 3/017
See application file for complete search history.

(56) References Cited

U.S. PATENT DOCUMENTS

| | | | | |
|---|---|---|---|---|
| 4,932,007 | A * | 6/1990 | Suomala | A01M 29/16 43/17.1 |
| 5,010,774 | A * | 4/1991 | Kikuo | G06F 3/016 901/46 |
| 7,225,404 | B1 * | 5/2007 | Zilles | G06F 3/01 715/848 |
| 2006/0007784 | A1 * | 1/2006 | Lerro | G01S 15/32 367/98 |
| 2007/0233389 | A1 * | 10/2007 | Stephens | B63B 21/50 702/6 |
| 2008/0186152 | A1 * | 8/2008 | Kyung | G06F 3/016 340/407.1 |
| 2010/0079264 | A1 * | 4/2010 | Hoellwarth | G06F 3/016 340/407.2 |
| 2014/0165898 | A1 * | 6/2014 | Cierpka | G01S 15/89 114/312 |
| 2014/0204715 | A1 * | 7/2014 | Napolitano | G01S 5/22 367/125 |
| 2016/0070265 | A1 * | 3/2016 | Liu | G01C 21/3848 701/25 |
| 2016/0239086 | A1 * | 8/2016 | Do | H01F 7/126 |
| 2019/0278369 | A1 * | 9/2019 | Ballard | A63F 13/28 |
| 2020/0109954 | A1 * | 4/2020 | Li | G01C 21/3848 |
| 2020/0357249 | A1 * | 11/2020 | Al-Husseiny | G06F 3/016 |
| 2021/0191400 | A1 * | 6/2021 | Chung | G05D 1/0206 |
| 2021/0371067 | A1 * | 12/2021 | Lebo | B33Y 80/00 |
| 2023/0150630 | A1 * | 5/2023 | Morozov | H04B 13/02 114/339 |
| 2023/0339121 | A1 * | 10/2023 | Mikael | G06F 3/0346 |

OTHER PUBLICATIONS

Xia, Pengxian, et al., "Sensory Augmentation for Subsea Robot Teleoperation", *Computers in Industry*, vol. 145, (14 pages), Dec. 17, 2022, https://doi.org/10.1016/j.compind.2022.103836.

* cited by examiner

HAPTIC SYSTEM FOR ROBOT TELEOPERATION OF A REMOTELY OPERATED VEHICLE

CROSS-REFERENCE TO RELATED APPLICATIONS

This application claims priority to U.S. Provisional Application No. 63/368,074, filed on Jul. 11, 2022, the content of which is hereby incorporated by reference in its entirety.

ACKNOWLEDGEMENT OF FUNDING

This invention was made with government support under 2128895 awarded by the National Science Foundation. The government has certain rights in the invention.

TECHNOLOGICAL FIELD

Embodiments of the present disclosure relate generally to remote control of a robotic device, and more particularly, to a haptic system for robot teleoperation of a remotely operated vehicle.

BACKGROUND

Remotely operated vehicles are useful in a variety of environments particularly those that are difficult or unsafe for the presence of human operators. One such example is subsea operations. Subsea engineering operations heavily rely on remotely operated vehicles (ROVs) and the performance of an ROV depends on the ability of an operator to control the ROV. With approximately 95% of the world's oceans and 99% of the ocean floor being unexplored, the need for ROVs in such environments is growing.

Remote control of ROVs is a non-trivial task due to the ROV's chosen locomotion mechanism (e.g., wheel drive, propellor drive, walking, etc.) and constraints of the operating location, such as locations having low visibility. Generally, operator feedback from such remotely operated vehicles is limited to a camera view of the operating location from a perspective of the ROV. It is difficult for a human operator to develop an accurate spatial understanding of an operating location and environment with such limited visibility which can lead to problems such as disorientation and motion sickness from remote operation of the ROV. Embodiments described herein overcome the challenges of remote operation of ROVs.

BRIEF SUMMARY

A system, apparatus, and method are provided herein for remote control of a robotic device, and more particularly, to a haptic system for robot teleoperation of a remotely operated vehicle. According to an example embodiment, a system for robot teleoperation is provided including: an underwater robot vehicle; a subsea sensing module associated with the underwater robot vehicle; a workplace module; and a user interface, where the subsea sensing module senses an environment of the underwater robot vehicle and provides sensor data to the workplace module, where the workplace module reproduces the environment and instructs the user interface to provide sensory augmentation associated with the environment to an operator. The system of an example embodiment further includes a robot control module, where the user interface receives input from the operator and the robot control module controls the underwater robot vehicle according to the input. The user interface of an example embodiment receives input in the form of body gestures of the operator, where the robot control module controls the underwater robot vehicle according to the body gestures of the operator.

According to some embodiments, the subsea sensing module senses hydrodynamic features and temperatures of the environment of the underwater robot vehicle. The user interface of an example embodiment provides haptic feedback to the operator indicative of hydrodynamic features of the environment of the underwater robot vehicle. The hydrodynamic features of an example embodiment include water currents affecting the underwater robot vehicle. According to some embodiments, the user interface includes: a body-worn haptic feedback garment including a first sensor array disposed across a front side of the operator and a second sensor array disposed across a back side of the operator, where the body-worn haptic feedback garment provides haptic feedback to the operator reflecting a position and orientation of the robot.

The body-worn haptic feedback garment of an example embodiment provides haptic feedback to the operator reflecting hydrodynamic features of the environment of the underwater robot vehicle. The user interface of an example embodiment further includes a virtual reality headset worn by the operator, where the virtual reality headset provides a visual indication of the environment of the underwater robot vehicle. The first sensor array of an example embodiment includes a first sensor array of vibratory sensors, where the second sensor array includes a second array of vibratory sensors. The first sensor array of an example embodiment includes a series of rows and columns of the vibratory sensors and the second sensor array includes a series of rows and columns of the vibratory sensors.

Embodiments provided herein include a method for robot teleoperation including: receiving, at a workplace module, sensor data from a subsea sensing module associated with an underwater robot vehicle; and generating, at the workplace module, instructions for user interface, where the instructions provide sensory augmentation to an operator of the underwater vehicle through the user interface. The method of an example embodiment further includes: receiving input from the user interface from the operator; and controlling, via a robot control module, the underwater robot vehicle. The input from the user interface includes, in some embodiments, body gesture input, where the body gesture input causes movement of the underwater robot vehicle.

According to some embodiments, the sensory augmentation to the operator of the underwater robot vehicle through the user interface is provided as haptic feedback, where the haptic feedback is indicative of hydrodynamic features of the environment of the underwater robot vehicle. The hydrodynamic features of an example embodiment include currents affecting the underwater robot vehicle. According to some embodiments, generating, at the workplace module, instructions for the user interface includes generating, for the user interface using at least one of a game engine or a physics engine, haptic feedback instructions for the user interface based on the sensor data from the subsea sensing module associated with the underwater robot vehicle.

The method of some embodiments further includes: generating, at the user interface, haptic feedback for the operator based on the haptic feedback instructions, where the haptic feedback provides simulation of an environment of the underwater robot vehicle. The simulation of the environment of the underwater robot vehicle includes simulation of hydrodynamic properties of the environment of the underwater vehicle. The simulation of the environment of the underwater robot vehicle further includes, in some embodiments, simulation of movement of the underwater robot vehicle through the environment.

The features, functions, and advantages that have been discussed can be achieved independently in various embodiments or may be combined in yet other embodiments; further details of which can be seen with reference to the following description and drawings.

BRIEF DESCRIPTION OF DRAWINGS

Figure 1:
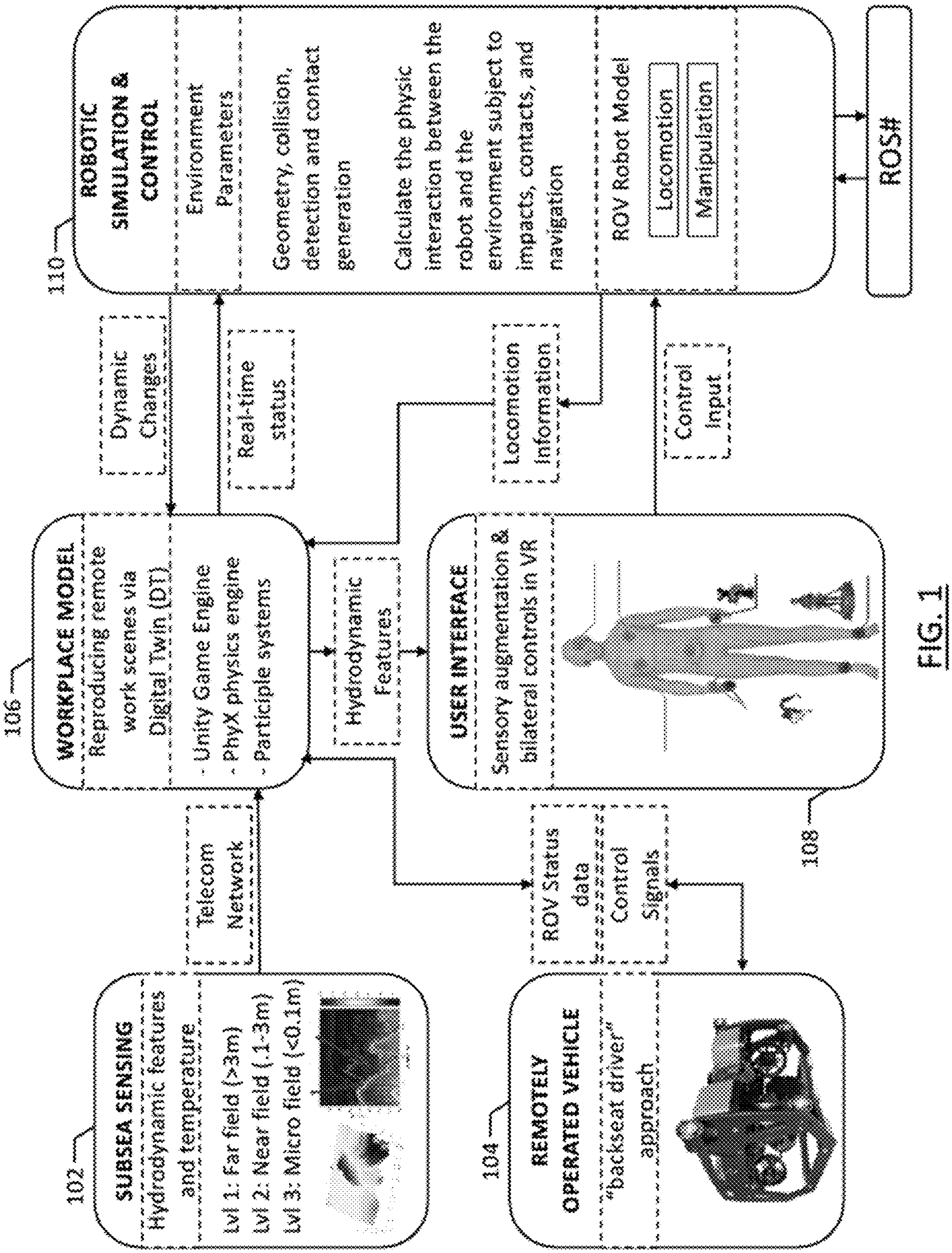
Figure 2:
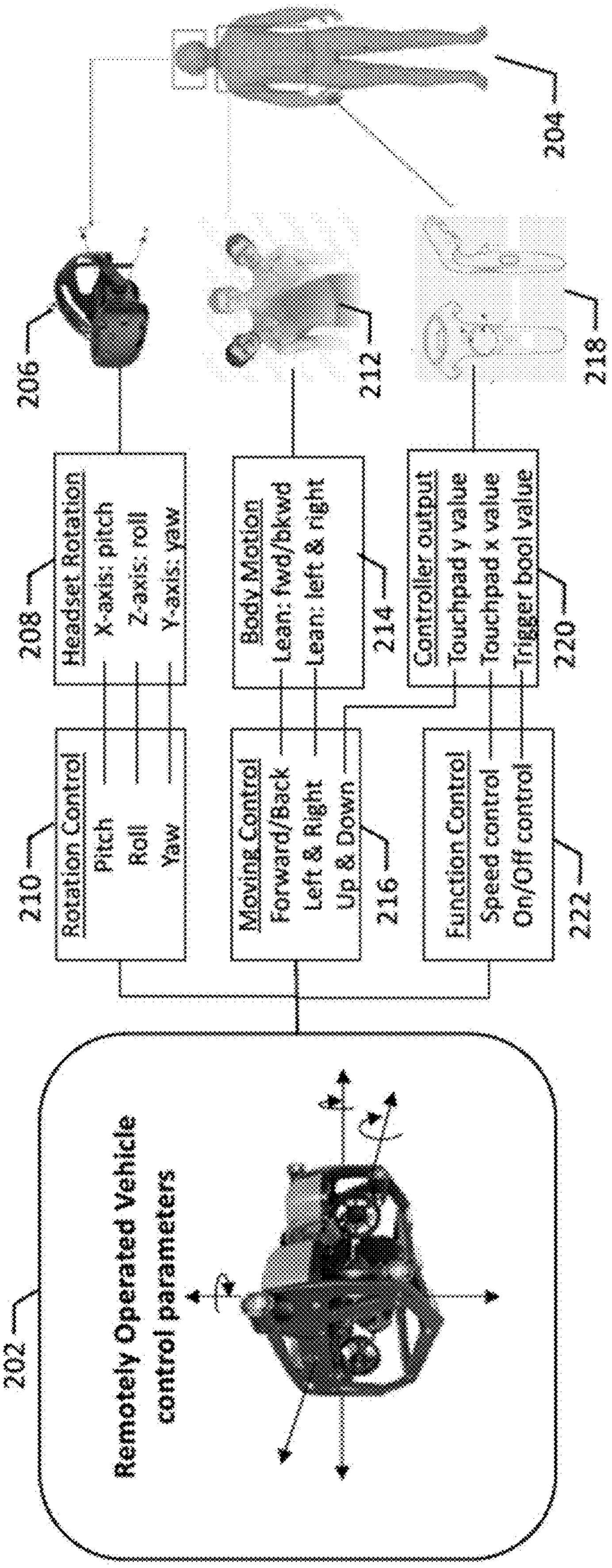
Figure 3:
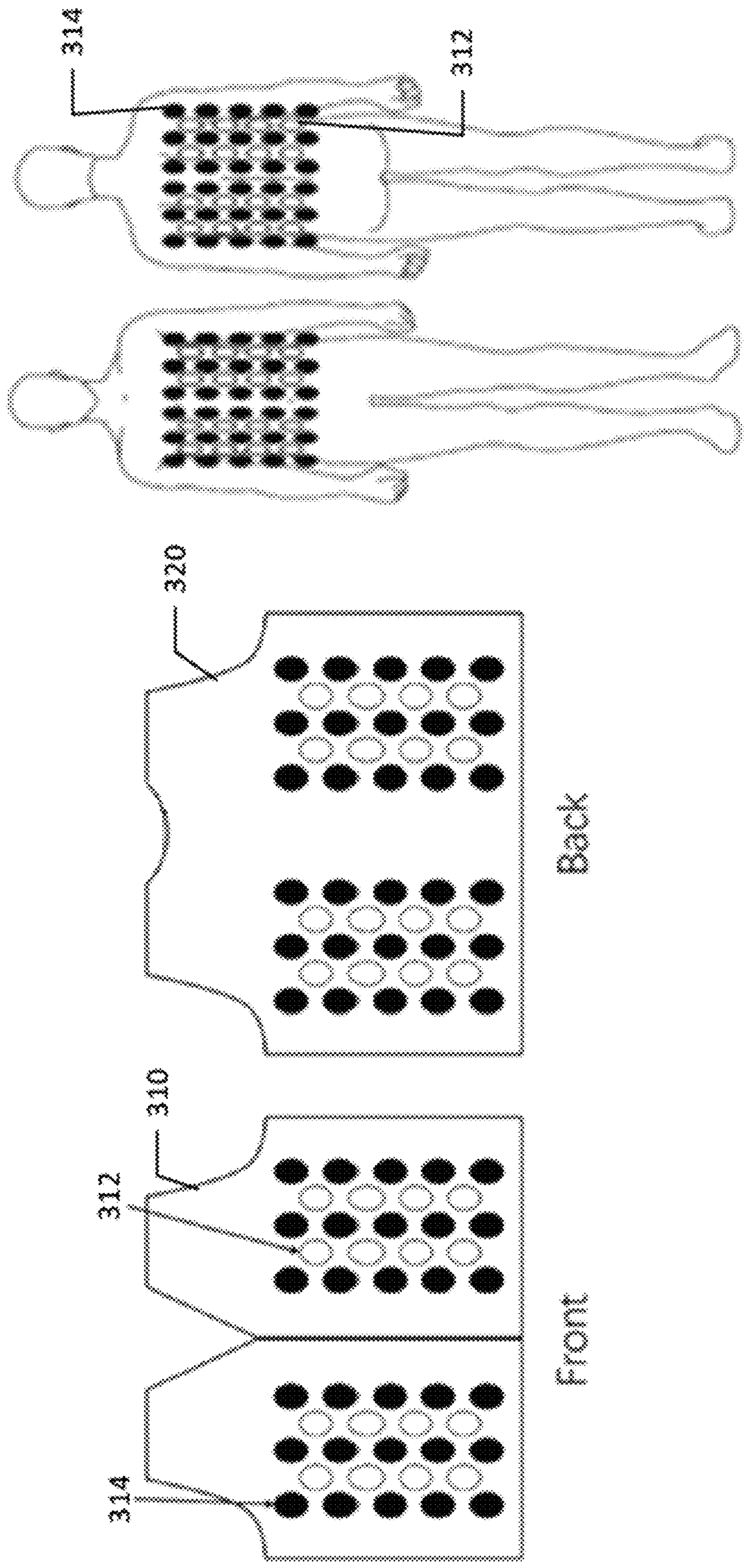
Figure 4:
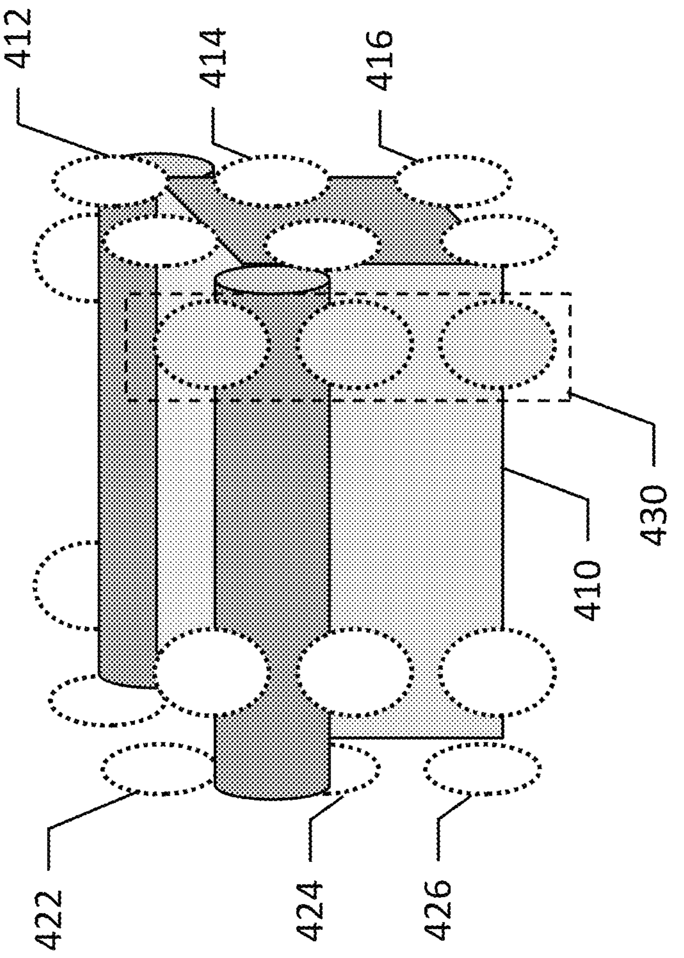
Figure 5:
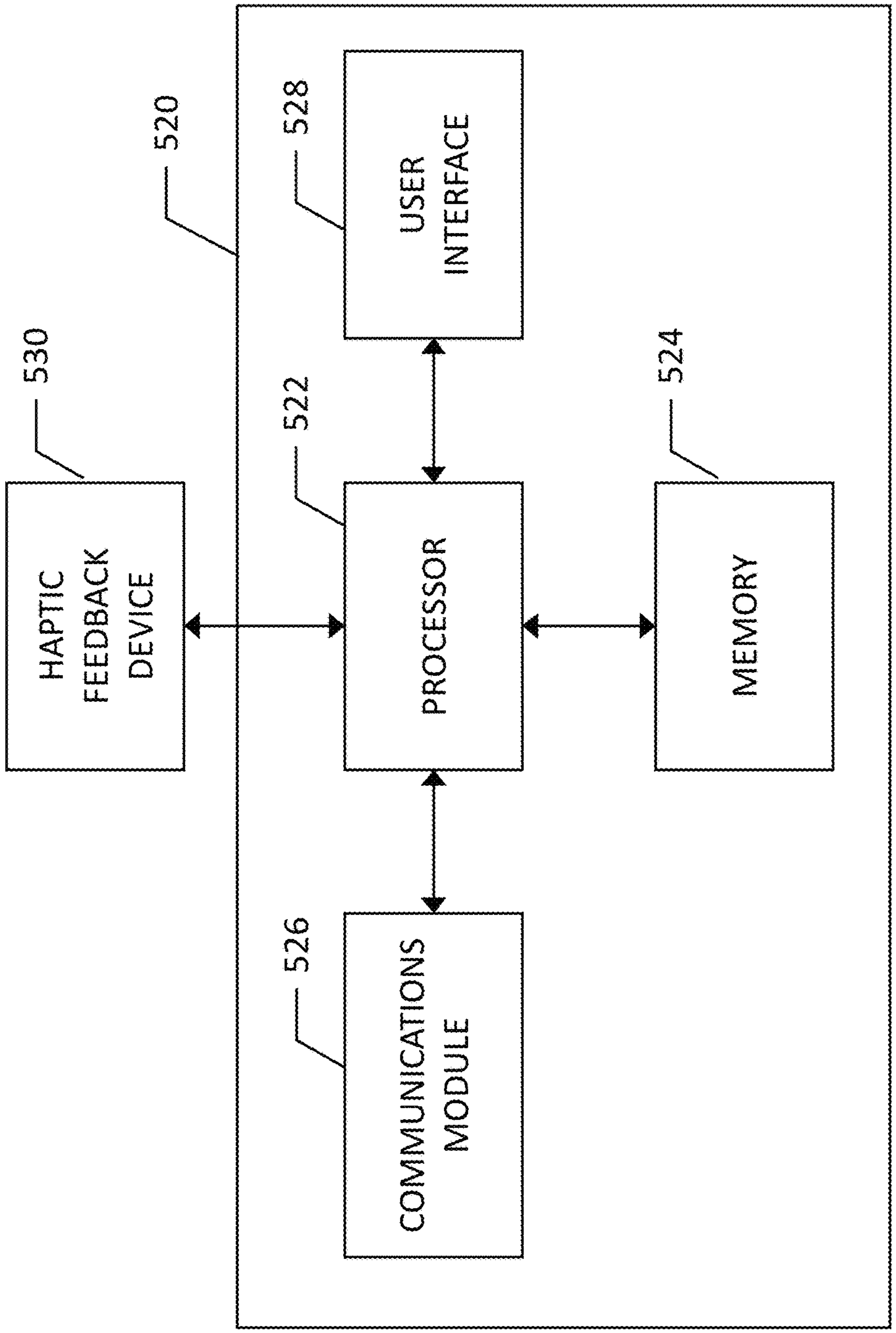

Having thus described certain embodiments of the present disclosure in general terms, reference will now be made to the accompanying drawings, which are not necessarily drawn to scale, and wherein:

FIG. 1 illustrates a diagram of a system for underwater robotic vehicle control according to an example embodiment of the present disclosure;

FIG. 2 illustrates a diagram of a system for haptic feedback and control of an underwater robotic vehicle according to an example embodiment of the present disclosure;

FIG. 3 illustrates a sensor array for a body-worn haptic feedback device according to an example embodiment of the present disclosure;

FIG. 4 illustrates a sensor array for an underwater robotic vehicle according to an example embodiment of the present disclosure; and FIG. 5 illustrates a block diagram of a controller configured for teleoperation of an underwater robotic vehicle according to an example embodiment of the present disclosure;

DETAILED DESCRIPTION

The present disclosure now will be described more fully hereinafter with reference to the accompanying drawings, in which some, but not all embodiments are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

Remotely operated vehicles (ROVs) are desirable for operation in environments that are inaccessible or unsafe for human operators. ROVs provide opportunities for improved efficiencies by having an operator that can be located in a comfortable working environment while an ROV can be located in any location that has an available communication link. ROVs in locations that are difficult to access such as subterranean locations or in space can be operated by an operator that does not have to travel to the location of the ROV. Potentially unsafe locations, such as in deep water environments become accessible using ROVs, which can also be used for longer periods of time than a human can spend in such subsea environments. Embodiments described herein can be employed for control of ROVs in a variety of environments; however, one example embodiment described herein is operation of ROVs in underwater environments. As will be appreciated by one of ordinary skill, embodiments for haptic control of ROVs as described herein can be employed in any number of environments where ROVs are suitable for operation.

Subsea engineering operations rely heavily on ROVs and the performance of these ROVs depend upon the seamless interaction between an ROV and the human operator. Due to the dynamics of the subsea environment, such as uncertainty of currents/flow or turbulence, affected visibility, and interference with subsea ecosystems, control of subsea ROVs is challenging for a human operator, particularly those who have not been exposed to such an environment. Traditionally ROVs are controlled using visual feedback (e.g., from a camera on the ROV); however, this control system does not provide direct and intuitive guidance in ROV operations to provide enough information about the environmental uncertainties. To augment human sensation of the ROV and operating environment, embodiments described herein include a hierarchical intuitive control method based on Virtual Reality (VR) and haptic simulators. A distributed sensor system that enables a flexible add-on sensor package for subsea environmental data collection can be applied to the controlled ROV to collect hydrodynamic data of subsea workplaces. A digital twin (DT) module can then receive and integrate all data to drive a simulation approach for data augmentation. Multi-level sensory feedback methods including far-field augmented three-dimensional (3D) visual feedback, near-field haptic suit tactile feedback, and micro-field haptic suit turbulence feedback are generated and sent to the human operator through haptic devices. Embodiments described herein ensure an immersive awareness of the proximity conditions and predictions of potential damage and status changes during ROV operations. As a result, an operator can pilot an ROV based on intuition to maximize the performance and avoid potential mistakes even with little experience.

The world is primarily covered with water, and around 95% of the world's oceans and 99% of the ocean floor remain unexplored. Augmentation of human abilities in subsea engineering work, such as offshore construction and inspection (e.g., floating cities and offshore wind farms) and subsea exploration and operations (e.g., offshore mining, subsea cables, and energy harvesting), provide a historic opportunity for growth in the development of subsea ROVs. With the development of ROVs comes the need for control systems.

Subsea engineering operations benefit from ROVs because of their agility, safety, and endurance, but the teleoperation of ROVs remains challenging and risky due to the mismatch between the complexity of subsea workspaces and the limited experience of human operators. ROVs often include a submersible vehicle, a surface control unit, and a tether management system. Technicians from above the water surface, such as working on a vessel, can control the ROV to accomplish complex tasks with a live video stream captured by cameras on the ROV. The complexity of the subsea environment, such as the dynamic internal currents, low visibility, and unexpected contact with marine life can undermine the stability of the ROV. While ROVs can be equipped with some degree of self-stabilization or even self-navigation functions, human controls remain necessary for complex tasks that require precise operations. Human sensorimotor control relies on multimodal sensory feedback, such as visual and somatosensory cues to make sense of the consequence of any initiated action.

In ROV teleoperations, the lack of ability to perceive various subsea environmental and spatial features, such as the inability to directly sense water flows and pressure changes, can break the critical feedback loop for accurate motor actions, resulting in an induced perceptual-motor malfunction. As ROV capabilities increase, the tasks that can be performed by ROVs increases in complexity, such as navigation in tight, cluttered, and unstructured environments, stabilization in highly dynamic flow conditions, repeated docking/undocking operations, etc. all require varieties of environmental information and in-situ perception of the ROV working environment. Further, information about the ambient fluid environment at different spatiotemporal scales would benefit ROV operations substantially. Embodiments described herein provide an ROV operator the ability to see, hear, and feel the subsea workspace and ROV status with multisensory capacity in an intuitive way.

Embodiments described herein provide a virtual telepresence system based on VR and a sensory augmentation simulator to mitigate the perceptual-motor malfunction and to enhance human perception as well as operation accuracy in ROV teleoperation. To provide multi-level information to meet the versatility of future ROV teleoperation, a hierarchical haptic simulator is proposed to simulate subsea environmental features on the body of a human operator via hapto-tactile sensations. These subsea environmental features can include, for example, near-field (less than three meters) and small-scale hydrodynamics around the ROV that can affect the stabilization and maneuverability, and far-field (more than three meters) mean hydrodynamic flows that are critical to the ROV navigation and motion planning. Embodiments further provide an augmented force rendering with a pair of high-fidelity haptic gloves for sensing micro-scale turbulence to further extend human sensation. The multi-level environmental information is collected by ROV-equipped sensors sent to the digital twin module for data fusion and reconstruction, and converted into different scales of visual and haptic feedback through different devices accordingly. With this integrated VR-haptic sensory feedback system, the human sensation f the robot workspace is extended, which benefits ROV teleoperation for complex subsea operations.

Although ROVs vary in their capabilities (e.g., with respect to sensing and actuation), they typically have capabilities such as maneuverability along more than one principal axis, state estimation, and communication through an umbilical cable or additional wireless means. Some ROVs, such as those employed in industrial or scientific applications may include more sophisticated actuation and sensing capabilities to ensure operational accuracy and to improve system reliability. According to an example embodiment an ROV may include systems to improve vehicle control robustness in dynamic and uncertain conditions. Embodiments may include a disturbance rejection controller to improve maneuvering accuracy in the event of unknown environmental forces acting on the vehicle. Such capability benefits ROVs when performing manipulation tasks, where the body of the ROV needs to hold its position to allow precise control of the end effector. Existing station holding controllers are often responsive or reactive working as after-the-effect disturbance compensators, where the controller does not make a correction until an error appears due to disturbances. Such vehicle stabilization results in hysteresis that imparts delays and inaccuracies in ROVs.

While ROV technology has improved over years of development, underwater ROV control remains challenging and demanding even for experienced ROV pilots. Two substantial factors that adversely impact ROV piloting include a lack of easily perceivable vehicle feedback provided about the ROV's environment to a pilot and there is a lack of an intelligent and pilot-centric autopilot system that can stabilize the ROV and ensure closed-loop piloting performance. Current ROV piloting relies heavily on visual feedback from on-board cameras leaving the pilot unaware of the fluid environment surrounding and ahead of the vehicle. As the complexity of ROV tasks increases, ROVs as described herein with high levels of autonomy with human-in-the-loop control can relay underwater perceptions of different modalities back to the human operator in real-time, creating an intuitive and immersive piloting experience.

Virtual Reality (VR) is an emerging human-computer interface for rendering realistic environment scenes and for providing rich spatial information. VR for human-robot collaboration (HRC) has brought benefits of coupling the perception and controls between human agents and robots. Such a close sensation pairing can result in a better plan of motions and interactions in difficult tasks that require both robotic and human intelligence. For robot teleoperation, compared to traditional 2D imagery or video feedback, the advantage of VR is to provide a direct and immersive 3D visualization of the target object or scene within the surrounding workplace, therefore converting richer environmental information and relationships between multi objects to human users, and lowering the communication and control barriers.

In addition to augmenting visual feedback, VR as described herein can serve as a platform for multisensory augmentation providing multimodal visual, auditory, and haptic cues associated with an intended action to improve motor performance. Haptic devices combined with a VR simulation can generate hapto-tactile simulation (e.g., vibrations and force feedback) on an operator's body in correspondence with occurring events. These hapto-tactile signals may be used as feedback cues signing for the human operator's sensation to help understand the motion and status of ROVs, which can further improve human spatial awareness and control of ROVs. Embodiments provided herein employ sensors on an undersea ROV in combination with a haptic feedback enabled VR system to capture high-fidelity hydrodynamic data at both the micro and macro levels, as well as simulations to create a unique immersive sensory-rich environment for ROV operation. Example embodiments augment human ability in critical decision-making such as navigation path planning. Embodiments employ a framework of digital twins simulation to integrate the data processing and decision-making need for the proposed system.

Digital Twin (DT) is a comprehensive digital representation connecting to physical products. It includes properties, conditions, and behaviors of a real-life object through models and data. An effective DT for example embodiments described herein employs modeling, simulation, verification, validation, and accreditation, data fusion, interaction and collaboration, and service. DT of example embodiments is used for data fusion and augmentation, including integrating different data sources and filling gaps in the collected data.

Embodiments provided herein include a system combining VR simulation and a body-worn haptic device, such as a whole-body or partial-body haptic device, to augment a human operator's sensation in ROV teleoperation. FIG. 1 illustrates the architecture of an example embodiment. According to the illustrated embodiment there are five modules including the Subsea Sensing module 102, the Remotely Operated Vehicle module 104 or ROV module, the Workplace Model module 106, the User Interface module 108, and the Robotic Simulation and Control module 110.

Subsea Sensing Module

Subsea workplaces are substantially different from conventional workplaces, and thus the human operator may not perceive the environmental data in a desired way or a way that is easily interpreted and understood by the operator. As a result, the sensing system of the Subsea Sensing module 102 is configured to capture the key characteristics of a dynamic underwater environment for sensory augmentation. The Subsea Sensing module 102 of embodiments described herein builds on a multi-level sensor network to collect real-time subsea environmental data pertaining to the hydrodynamic features and temperature changes. The sensor network of an example embodiment captures three levels of sensor data to meet the sensing needs, including far field hydrodynamic status based on an acoustic Doppler current profiler (ADCP) to collect underwater wave profiles in the 3 meter-20 meter proximity; near field (0.1 meter-3 meter) and micro field (<0.1 meter) turbulence based on in-situ sensors equipped on the ROV. The far field sensing aims to identify the sudden change of underwater wave in a bigger scale, or the so-called "seamount". The existence of seamounts pose significant risks to the teleoperation of ROVs as they usually intensify the tidal flow and water stratification, interrupting on-going ROV operational profiles.

The in-situ sensor of example embodiments leverages an artificial skin—an innovative distributed sensor system that allows a flexible add-on sensor package for an ROV. The artificial skin uses an array of paired differential pressure sensors mounted on electronics boards. The boards can be embedded in elastomers with hardware that allows them to connect to a 3D printed scaffolding or a custom shell of the ROV. A hydrodynamic force measurement module is fabricated and installed onto the ROV to enable the vehicle to sense near-field flows and hydrodynamic forces. Different scales of flow sensing measurements are collected by the sensor module and sent to the digital twin (DT) simulation and optimization module for data fusion, smoothing, and reconstruction. The artificial skin sensing system enables fast disturbance detection and rejection to improve vehicle control accuracy. The design of the in-situ sensor of an example embodiment uses lateral-line sensory mechanism which consists of specialized "hair-cells" throughout the body surface capable of detecting pressure gradients and shear stress. Sensing signals include temperature, pressure gradient, and shear stress sensors distributed throughout a custom shell designed to fit to the surface of the ROV.

The visual and haptic sensor data from the Subsea Sensing module 102 is sent as feedback the Workplace Model module 106 to generate a real-time and realistic sense of the ROV workspace for humans through multi-modal sensory devices. According to some embodiments, to enable continuous operation and long-term availability, the proposed system may be designed to be a resident system with a docking station that can be deployed for long terms and tasked remotely from a remote station on land. The docking station can use power and communication interfaces available from existing cabled subsea observatories, marine renewable energy harvesting system, or inter-continental telecommunication infrastructure. The ROV of such an embodiment can be connected to a docking station through a cable management system for high reliability and bandwidth in data transfer, and the docking station is connected to a remote human operator via the Internet. The bioinspired flow sensing system is integrated with the vehicle to provide in-situ hydrodynamic force measurements. In addition, the DT simulated environment can be also used as a fast training of new operators and provide pre-mission evaluation for operation plans.

Remotely Operated Vehicle Module

The ROV of example embodiments can include substantially any robotically controlled vehicle suitable for remote operation or teleoperation. For subsea ROVs, an example embodiment may include an underwater vehicle equipped with thrusters in a vectored configuration. The thrusters can provide the ROV with movement in all six degrees of freedom. The ROV can be battery operated or powered via an umbilical, for example. Embodiments can include a computing device, such as a Jetson Xavier NX backseat computer to perform high-level sensor fusion and closed-loop control autonomy. The vehicle of an example embodiment may be outfitted with a bottom-facing single-beam echosounder that measures distances with respect to the seafloor for up to 50 meters and a 360-degree scanning imaging sonar for underwater perception. In addition, the ROV of an example embodiment may be equipped with a doppler velocity log with current profiling capability that allows the ROV to measure the relative velocity with respect to the seafloor as well as the far-field flow velocity for augmenting the operator's situational awareness in the digital twin environment.

The ROV of an example embodiment may be outfitted with forward and bottom facing cameras, a 360-degree scanning sonar for obstacle detection, collision avoidance, and mapping. Embodiments may further include a custom-integrated wireless charging and communication system, and a 1-MHz compact acoustic Doppler current profiler (ADCP) to provide volumetric far-field flow measurements. The near-field flow and hydrodynamic force sensor of certain embodiments are added to the vehicle as a separate module at locations free from structural obstructions, which may create vortex shedding and affect the sensing quality. This novel sensor system enables the ROV to directly measure the hydrodynamic disturbances and compensate accordingly before positioning error starts to appear, improving the vehicle control accuracy and responsiveness.

Embodiments described herein can employ a "backseat driver" computing method to realize the open loop control needs. As previously noted, there may be a disconnection between the control commands issued by the human operator and the actual reaction of the ROV due to the changing hydrodynamic conditions in the subsea workplace. As a result, a resolver can be employed to generate the correct rendering of ROV kinematics in VR. The same applies to the controlling of the real ROV, as the real system also needs to match the control commends and mirror the behaviors in the VR environment. The same hybrid solver can be applied on the backseat driver computer. In addition, near-field flow sensing measurements can be reflected on the haptic suite and gloves on the pilot to enhance the situational awareness of the pilot.

Robotic Simulation and Control Module

Physics engine simulation data and sensor data from the remote ROV need to be transferred to Robot Operating System (ROS) seamlessly to enable ROV simulation and controls. Example embodiments provided herein include a data synchronization system for VR and robotic systems featuring two primary functions: converting environmental parameters extracted from the workplace model (hydrodynamics, objects, and interactions) to ROS to rebuild the 3D scene in ROS Gazebo for robot simulation; and to enable the control commends for the ROV. A JavaScript Object Notation (JSON) Application Programming Interface (API) is used for transferring data to and from the ROS. A Web Socket server for web browsers can be implemented to interact with the ROS, serving as a connecting between ROS and the network. The ROS server converts ROV dynamics data into JSON messages via and publishes it to the website or receives JSON message from Internet and converts it to ROS message. On the robotic simulation side employing the robotic simulation and control module 110, ROS #, a set of open-source software libraries in C #, can be used for communicating with ROS from .NET applications, such as Unity. According to such an embodiment, ROS #can establish a Web Socket in Unity so that Unity can connect to a computer with a specific IP address through the network and transfer data. This process helps to build nodes that publish and subscribe topics from ROS in Unity. ROS #converts data into JSON and publishes it or converts the received data into the original format. The ROS server and the Web Socket can be given the same IP address, such that the ROS server can publish the processed topics to the ROS platform, and the Unity can subscribe to all topics on ROS platforms through ROS #.

The robotic simulation and control module 110 of example embodiments further supports an intuitive control of the remote ROV via natural body motions. FIG. 2 illustrates motion correlation between the ROV 202 and the human operator 204. Human control input parameters, including local rotation of HTC trackers, body postures and a secondary auxiliary controller, are designed to match ROV control parameters such as rotation, moving and some specific control functions. The local rotation of human body via the headset 206 is sent as headset rotation 208 to ROV as rotation control 210 for pitch, roll and yaw control, which ensures ROV's orientation consistent with human operator's 204 body motion. Human body postures 212 in the form of body motion 214 are designed to control ROV moving in the subsea environment through moving control 216. For example, ROV pitch down when human operator leans forward. A secondary auxiliary control method, such as a joystick controller 218 or the like is provided in some embodiments for vertical up and down operations and function control 222 using the controller output 220. Specifically, according to the illustrated embodiment, the y axis input value of touchpad was used to control up and down for ROV, with the x axis value for speed control. The Boolean value of trigger button can be used to control the system on and off.

According to example embodiments described herein, seamless ROV teleoperation is provided to render the kinematics features of the remote ROV in VR (e.g., speed, gesture etc.). The locomotion control signals from the human operator are not always realized on the remote ROV due to the dynamic subsea environment. For instance, a human operator may lean forward by 10 degrees to command the corresponding 10-degree negative pitch of the ROV. Nonetheless the real ROV may only demonstrate a 5-degree pitch due to the liquid viscosity underwater. As such, the reactions of the ROV kinematics of an example embodiment are regenerated despite what controls are given by the human operator. According to embodiments provided herein, real ROV kinematic data collected from onboard sensors is not relied upon as the possible tracking errors or telecommunication latencies. Instead, real-time ROS Gazebo simulation is used to recover the predicted ROV kinematics status. Reproducing the robotic dynamics in ROS Gazebo in a precise and accurate manner is performed using a hybrid solver that solves both the linear elasticity and hydrodynamic changes of the simulated ROV in Gazebo.

Motion-Based ROV Control

While a variety of control systems can be used to control the remotely operated vehicle in different embodiments, a control system is provided herein that controls the movement of ROVs using natural body motion. Embodiments enable operators to control ROVs intuitively and efficiently, reducing a learning curve and fatigue associated with conventional control methods, such as joysticks and buttons. The system of an example embodiment tracks operator motion, interprets the captured motion, and controls the ROV accordingly.

Motion tracking with a motion tracking subsystem captures and processes movements of the operator's body or select portions thereof. Embodiments can employ Inertial Measurement Units (IMUs) to measure linear acceleration, angular velocity, and magnetic field strength to track the operator's body motion in real-time. IMUs can be embedded in wearable devices, such as gloves or suits, to capture movements of specific body parts. Optical motion capture systems can also be employed. These optical motion capture systems use cameras and markers to track the operator's body movements. Markers can be placed on the operator's body or incorporated into wearable devices, such as suits or gloves. The cameras capture the positions of the markers, allowing the system to reconstruct the operator's movements. Depth sensing cameras can also be used to capture information about an operator's body movements and an environment of the operator. These cameras can be used in conjunction with machine learning algorithms to estimate body motion without the need for wearable devices or markers.

Once the motion is captured, it needs to be interpreted. Embodiments employ a motion interpretation subsystem that is responsible for translating the operator's body movements into ROV control commands. This motion interpretation subsystem can include machine learning algorithms and gesture recognition techniques to determine an intended control action based on the captured motion data. To address the challenge of mapping human body motions to ROV locomotion features, a set of motion mapping formulas are defined that convert the captured body movements and hand gestures into the desired ROV motions. These formulas can take into account the differences in movement capabilities between different operators and ROVs, as well as the need to provide an intuitive and efficient control scheme.

Mapping operator motion to ROV operation can include different formulas for different ROV operations, such as yaw, roll, pitch, sway, surge, dive, and heave. A mapping formula for yaw, or rotation around a vertical axis of the ROV, can include:

$$\text{Yaw\_rate\_ROV} = \text{k\_yaw} * \text{Yaw\_rate\_human} \quad \text{Eq. 1}$$

The ROV's yaw rate can be controlled by the operator's head rotation around the vertical axis in an example embodiment. The yaw rate of the operator (Yaw_rate_human) can be scaled down using a constant factor (k_yaw) to match the ROV's capabilities. A calibration process may be performed at a start of operation or system setup to identify the most comfortable value for each human operator. As an example, the default value of k_yaw may be 0.5.

Roll, or rotation around a longitudinal axis of the ROV may include mapping formula:

$$\text{Roll\_rate\_ROV} = \text{k\_roll} * \text{Roll\_rate\_human} \quad \text{Eq. 2}$$

The ROV's roll rate can be controlled, for example, by the operator tilting their arms laterally. The roll rate of the human (Roll_rate_human) can be scaled down using a constant factor (k_roll) to match the ROV's capabilities. A calibration process can be performed at a start of operation or system setup to identify the most comfortable value for each human operator. As an example, the default value of k_roll may be 0.75.

Pitch, or rotation around a transverse axis of the ROV may include mapping formula:

$$\text{Pitch\_rate\_ROV} = \text{k\_pitch} * \text{Pitch\_rate\_human} \quad \text{Eq. 3}$$

The ROV's pitch rate can be controlled, for example, by the operator tilting their head forward or backward. The pitch rate of the operator (Pitch_rate_human) can be scaled down using a constant factor (k_pitch) to match the ROV's capabilities. A calibration process can be performed at a start of operation or system setup to identify the most comfortable value for each human operator. As an example, the default value of k_pitch may be 0.75.

Sway, or lateral motion of the ROV may include mapping formula:

$$\text{Sway\_velocity\_ROV} = \text{k\_sway} * \text{Sway\_velocity\_human} \quad \text{Eq. 4}$$

The ROV's lateral motion can be controlled, for example, by the operator stepping sideways. The lateral velocity of the human operator (Sway_velocity_human) can be scaled up using a constant factor (k sway) to match the ROV's capabilities. A calibration process can be performed at a start of operation or system setup to identify the most comfortable value for each human operator. As an example, the default value of k sway may be 1.2.

Surge, or the forward and backward motion of the ROV may include mapping formula:

$$\text{Surge\_velocity\_ROV} = \text{k\_surge} * \text{Surge\_velocity\_human} \quad \text{Eq. 5}$$

The ROV's forward and backward motion can be controlled, for example, by the operator's leg movements, including walking in place or making a kicking motion. The surge velocity of the human operator (Surge_velocity_human) can be scaled up using a constant factor (k_surge) to match the ROV's capabilities. A calibration process can be performed at a start of operation or system setup to identify the most comfortable value for each human operator. As an example, the default value of k_surge may be 1.5.

Dive, or downward motion of the ROV may include mapping formula:

$$\text{Dive\_velocity\_ROV} = \text{k\_dive} * \text{Arm\_lowering\_rate\_human} \quad \text{Eq. 6}$$

The ROV's downward motion can be controlled, for example, by an operator lowering their arms. The arm lowering rate of the human operator (Arm_lowering_rate_human) can be scaled down using a constant factor (k_dive) to match the ROV's capabilities. A calibration process can be performed at a start of operation or system setup to identify the most comfortable value for each human operator. As an example, the default value of k_dive may be 0.25.

Heave, or upward motion of the ROV may include mapping formula:

$$\text{Heave\_velocity\_ROV} = \text{k\_heave} * \text{Arm\_raising\_rate\_human} \quad \text{Eq. 7}$$

The ROV's upward motion can be controlled, for example, by an operator raising their arms. The arm raising rate of the human operator (Arm_raising_rate_human) can be scaled down using a constant factor (k_heave) to match the ROV's capabilities. A calibration process can be performed at a start of operation or system setup to identify the most comfortable value for each human operator. As an example, the default value of k_heave may be 0.25.

The connection system of an example embodiment between the input (movement of the human operator) and output (motion of the ROV) includes a communication interface, middleware, and processor for transferring the motion control data into ROV controller information, as well as sending back the ROV sensor data into the haptic feedback system. The communication interface is responsible for establishing a reliable, low-latency connection between the processing unit and the ROV's onboard controller. Depending on the application, the interface can be implemented using either wired or wireless technology. For wired communication, tethered systems can employ a cable to transmit data between the processing unit and the ROV's onboard controller. This can be achieved with wired communication standards such as Ethernet, USB, RS-232/RS-485, etc. For untethered systems, wireless communication technologies such as Wi-Fi, Bluetooth, or custom radio frequency (RF) solutions can be employed. For underwater applications of an ROV, acoustic modems may be used to transmit data through water.

The middleware component of an example embodiment is responsible for facilitating the efficient exchange of data between the motion capture subsystem, the processing unit, and the ROV control subsystem. The middleware component can include a software layer that handles data serialization, deserialization, and transmission, as well as providing a standardized communication protocol. An example embodiment cn employ a Data Distribution Service (DDS) that is a publish-subscribe middleware that allows for the efficient and reliable exchange of data between different system components. The DDS can provide a standardized communication protocol, data-centric messaging, and quality of service (QoS) policies. A Robot Operating System (ROS) can be used as an open-source middleware for robotics applications, providing a flexible framework for inter-process communication, message passing, and service calls. The ROS also offers libraries, tools, and conventions for software development.

The ROV onboard system can include an onboard controller, sensor suite, actuators and components, power management, and system monitoring and diagnostics. The onboard controller of an example embodiment receives the control signals from the communication interface and translates them into actuation commands for the ROV's components. The controller can be implemented using microcontrollers, such as Arduino or Raspberry Pi, or dedicated hardware such as FPGA boards.

The sensor suite of an onboard system for an example embodiment of an ROV can include various sensors to provide feedback data to the processing unit. The sensors can include inertial measurement units (IMUs), depth sensors, pressure sensors, cameras, and sonar systems, for example. The ROV may further include actuators and components, such as motors, thrusters, manipulator arms, etc. that may be in communication with the onboard controller. These components can be actuated based on commands received from the onboard controller to execute the desired movements and functions. The onboard system of an example embodiment can further include an power management module to provide power to the ROV's components and manage energy consumption. This module can include batteries, power distribution units, and voltage regulators. The onboard system of some embodiments can include monitoring and diagnostic capabilities to ensure the ROV's proper functioning and report any faults or issues to the operator. The monitoring can include monitoring of temperatures, voltages, currents, etc. as well as error logging and reporting.

Workplace Model Module

The real-time sensor data of example embodiments described herein can then be used to model spatiotemporal dynamics of a subsea zone in the vicinity of the robot with the workplace model module 106. To generate an immersive visualization of the subsea workplace, a game engine can be used, such as Unity. Unity can model the far field sensor data as vectors and render the entire space as Virtual Reality displays. Embodiments further convert the hydrodynamic features into human-perceivable sensations, i.e., vibrotactile cues. To realize this function, a physics game engine such as NVIDIA PhysX may be used to simulate the underwater environment. Specially, the smoothed-particle hydrodynamics (SPH) particle method of PhysX can be used to simulate the hydrodynamic changes based on the sensor data. The raw data can be used to determine the initial conditions of the particle emitters. A collision detection mechanism can then be used to examine the collision events between each particle and the virtual ROV model. The collisions frequency and magnitude can be used to generate haptics of different levels as described further below.

Embodiments provided herein of the human-underwater robot interaction requires real-time modeling and visualization for "making sense" of the dynamic, dangerous, and underexplored subsea workplaces. Embodiments address the challenges of both data sparsity and data overload that could happen and are equally destructive in the effort of modeling the subsea workspace. A unique challenge of HRC in subsea operations is the overwhelming data that needs to be processed and digested in an instantaneous manner. Improvements for better underwater HRC involves reducing the complexity of underwater data processing via "sparse data modeling". Therefore, this digital twin simulation and optimization module is developed to integrate sensor data and hydrodynamic model for a better quality of workspace modeling.

In offshore environments, invisible flow structures are generated at different spatiotemporal scales, such as internal waves and shear instabilities. Intense internal waves can impact the navigation safety and operation of underwater robots. Shear instabilities can greatly enhance turbulence generation, which can result in high turbidity that scatters light and affects water clarity and optic sensors. The location and timing of these underwater processes are hard to predict; however, they often leave unique surface signatures that can be detected by remote sensing imagery. It is therefore important to integrate local sensors with ocean observation network data to provide accurate descriptions of the working environment. Embodiments described herein include a hierarchal process to model subsea workplaces. For modeling environment in close proximity of underwater robot, embodiments apply the robot-carried sensors to infer the turbidity, pressure, and temperature with hydrodynamic numerical simulation. This provides an estimate of workplace characteristics within a small radius (<3 m) centered around the underwater robot. For modeling the bigger range of the workplaces (>3 m), embodiments described herein relate the surface roughness information with hydrodynamic processes in the water column. Embodiments provided herein integrate data from observation networks with in-situ measurement by underwater robots and visualization of the data to provide an operator a direct link on how the magnitude, extent and process of large hydrodynamic events affect the operation of an underwater robot.

Statistical and numerical models are powerful tools to forecast ocean conditions, but the hydrodynamic numerical simulations are expensive and too slow for real-time underwater robot simulation and controls. As a result, embodiments described herein use reduced-order models to efficiently capture low-dimensional descriptions of the essential flow patterns at a fraction of the expense. With the large-volume of data from observation networks and high-resolution numerical simulations in the vicinity of the underwater robot, embodiments employ a physics-informed data-driven model. The model is based on the physical principles (conservation laws), and the low-dimensional model approximation is implemented using the Deep Convolutional Generative Adversarial Network (DCGAN) machine learning techniques.

Embodiments of the present disclosure apply the validated high-resolution numerical simulation data to train the network offline. The DCGAN network first extracts the spatial-temporal coherent flow structures of the high-dimensional fluid fields as low-dimensional latent variables. The governing equation of the low-dimensional representation of fluid field is solved following the same physical principles. The low-dimensional results are then projected back to the high-resolution space to provide accurate prediction of key characteristics of the flow that are important to operators. The data-driven model can be used to forecast circulation patterns, sea state, turbidity that affects optical sensors on underwater robots. In addition, using in-situ data collected by robots, the data-driven model could better capture and predict extreme events that are difficult to predict by classic hydrodynamic models.

According to certain embodiments, an improved path plan function is integrated into the DT simulation and optimization module for guided route planning. When the ADCP is installed in the forward-looking configuration, it can inform the vehicle and the operator about the ocean currents in front of the vehicle up-to hundreds of meters ahead. This information allows the operator to plan ahead for maneuver sequences that can avoid crossflows to maintain vehicle stability or can allow the vehicle to utilize the background flows such that the actuation energy can be minimized. More importantly, the autopilot can utilize the knowledge about the far-field current distribution to recommend energy-optimal vehicle trajectories. For instance, using the nonlinear vehicle hydrodynamic model as a dynamic constraint, energy-optimal maneuvering trajectories of a finite time-horizon can be found for an underwater vehicle using model predictive control. In addition, a context-aware Long Short-Term Memory (LSTM) based method can be applied for predicting trajectory areas of subsea moving objects. Such trajectory areas, together with unsafe areas calculated from sensor data and predicting models, such as high turbidity or crossflows area mentioned above, are viewed as obstacles for ROV path planning. A hierarchical path planning including a global planner and a local planner can then be adopted to plan the route, where the A* algorithm is selected as the global planner to find an optimal collision-free path and Dynamic Window Approach (DWA) can be used for the local planner to smooth path with dynamic constraints and stay close to the global path.

The A* method of embodiments described herein aims to find a path to the given goal node for the ROV with the smallest cost such as the least distance or the shortest time, by maintaining a path tree originating at the start node and extending one edge at a time until the goal is reached. In this method, a heuristic function h(n) illustrated in Eq. 8 is used to direct the ROV toward the target position, which is critical for the performance of the A* algorithm. The h(n) function is to calculate the distance between any node n $(x_n, y_n)$ and goal g $(x_g, y_g)$.

$$h(x_n, y_n) = |x_n - x_g| + |y_n - y_g| \quad \text{Eq. 8}$$

Then, the search cost f(n) defined in Eq. 9 is used to minimize the total cost, where g(n) represents the cost from the start point to any node n. The A* algorithm directs to the target point with the lowest search cost.

$$f(n) = g(n) + h(n) \quad \text{Eq. 9}$$

After a global path is generated, the local planner, DWA, generates linear velocity v and angular velocity w for the ROV maneuver. The algorithm samples velocities within a given time window and eliminates bad samples that intersect with obstacles. The optimal pair of (v, w) is decided by minimizing a cost function depending on the proximity to the global path, goal, and obstacles. The weighted cost function is illustrated in Eq. 10, where $f_a(v, w)$ represents the distance between the global path and the endpoint of the trajectory, $f_d(v, w)$ represents the distance between the goal and the endpoint of the trajectory, $f_c(v, w)$ represents the grid cell costs along the trajectory, α, β, γ is the weight for staying close to the global path, reaching the goal, and avoiding obstacles respectively. As such, a cost-effective and obstacle-free path is identified for the ROV path planning.

$$\text{cost} = \alpha f_a(v, w) + \beta f_d(v, w) + \gamma f_c(v, w) \quad \text{Eq. 10}$$

User Interface Module

The sensor module of example embodiments provided herein provides all kinds of necessary fluid information at different spatiotemporal scales. However, data collected by ROV sensors are spatially and temporally sparse, resulting in an incomprehensive sensory coverage and a low refresh rate of haptic feedback. Therefore, after the data fusion in the DT simulation and optimization module, improved data will be sent to the operator module for generating real-time and high-refresh-rate feedback. The user interface module

108 includes a subsea environment sensed by an ROV which provides sensory data to a haptic feedback device while visual information can be provided via VR device.

The VR environment is adjusted to the subsea workspace using a set of scripts specifically developed for ROV locomotion and navigation controls in the VR environment. The rendering of the subsea environment changes accordingly to provide a realistic sense of navigation in the simulation environment as in the real remote workplace. In addition, a hierarchical particle fluid simulation system is developed to receive real sensor data and generate a simulated flow, which hits with sensors around the ROV model and creates denser data (in addition to the raw sensor data) with a higher refresh rate. Embodiments provide functionality with the DT module augmenting the raw sensor data with additional simulated data points. The user interface module 108 is further realized with Unity data augmentation system and haptic feedback system, as described further below.

Unity Data Augmentation System

The Unity data augmentation system includes the far-field visual augmentation and the near-field particle simulation. For the far-field data, a series of vectors are visualized to indicate the overall hydrodynamic patterns necessary for the operator's navigation decision-making, including fluid directions, speed, and hydrodynamic gradient extensions. Vectors rendered in the DT simulation change with the direction in the same manner as flow data, with amplitude and frequency indicating the flow speed. Specifically, a more frequent swing and larger amplitude indicate faster and stronger water flows. The color of the vectors can be used to indicate the water temperature in the proximity area. Red can represent a higher water temperature while blue can indicate the contrary.

Compared to traditional camera view feedback, VR provides more enriched spatial information with immersive and interactive visual feedback. Besides, the VR system can provide the path planning function by displaying the identified optimal trajectories to the operator. The operator then has the option to either use these optimal trajectories as references during manual piloting or convert to autonomous controls that allow the autopilot of the ROV to follow those trajectories. By allowing the operator to configure the priorities of optimization (e.g., prioritizing travel distance over energy consumption), the proposed system frees the operator from low-level vehicle maneuver controls to a high-level mission control. Such a hierarchical system design can simplify the overall piloting effort during routine operations and reduce operation inaccuracy due to human errors.

On the other hand, for the near-field waterbody surrounding the ROV, a position-based particle system can be applied to simulate the physical interactions with the ROV in a realistic way. Position Based Dynamics (PBD) is a method to simulate realistic fluid conditions. Obi Fluid is an example of a core near-field particle simulation method that can be employed. The activated particle number of an example embodiment set to 650 for balancing the simulation fidelity and CPU cost. To simulate physical interactions between the waterbody and the ROV, seven particle emitters are set around the ROV model, as demonstrated. The initial parameters of these emitters, such as particle initial direction and speed, are based on the received hydrodynamic data from ROV pressure sensors. In addition, in the DT model, whatever actions the ROV operator initiates, would trigger the status changes to the emitters. For example, an emitter in front of the ROV model will generate a particle flow if operators perform a forward operation. The simulated emitter parameters would be used to fill the data gaps in raw sensor data (such as before real raw data was received or the gaps in sensor placement), but the raw sensor data still shares a higher priority. If any divergence between the DT simulation and raw data is sensed, raw data will override DT simulation results.

To be noted, the ROV-equipped sensors are effective in providing pressure descent data, and hence are effective for constructing realistic fluid meshes. But the raw sensor data would not provide parameters indicating flow intensity which is also needed for the DT simulation. Therefore, a script is developed to extract near-field particles' velocity when they collide with sensors around the ROV model. The flow intensity is calculated as Eq. 11:

$$F_{sensor} = \sum m_i * \hat{v}_i \qquad \text{Eq. 11}$$

Where $m_i$ is the mass of particle i, $\hat{v}_i$ is the normal vector of the velocity of particle I, i.e., the projection of speed perpendicular to the contact surface. In this equation, for each virtual sensor, a sum of normal momentum for all the particles colliding with the senor, $\Sigma m^*\hat{v}_i$, is calculated as the representation of flow intensity. In this particle fluid simulation, the mass difference of each particle does not need to be considered because the hydrodynamic features are manifested as the pressure gradient.

As a result, the mass m can be equally set to 1.0 in the equation. According to an example embodiment, all the virtual sensors around the ROV collect particle velocity data when a collision happens, and the final sum value is sent to haptic devices with a haptic intensity value from a proper range. Similarly, the micro-field haptic glove feedback is realized with the same method. For example, HaptX gloves can be used as the user interface. Each HaptX Glove features over 130 discrete points of tactile feedback that physically displace the user's palm up to 2 mm. HaptX Gloves also feature the strong force feedback, with exo-tendons that apply up to 40 pounds of dynamic force feedback per hand (8 lbs./35 N per finger). A haptic glove location model is created in VR to reflect the motions of operator's hands. When virtual fluid collides with the virtual glove model in Unity, the system generates a higher resolution haptic cue for simulating the micro-scale haptic feedback. To be noted, the same particle system can be used for glove-based haptic stimulation but with a higher resolution, as hands are more sensitive to bodies in terms of haptic sensation.

Haptic Feedback System

The haptic feedback system of example embodiments provided herein can include VR goggles or a VR headset worn on the head of the operator, a haptic suit such as an upper-body haptic suit or an upper/lower body haptic suit, and haptic gloves or hand-held haptic controllers. The motion of fluid surrounding the ROV can be sensed with virtual sensor objects in the Unity game engine.

Example embodiments of a haptic feedback system described herein includes a configurable haptic suit that is a specialized device designed to provide complete hydrodynamic information about the working environment of an ROV based on task needs and hardware. This innovative device is capable of providing high fidelity haptic feedback, even for large-sized ROVs, such as heavy work class ROVs. The haptic suit's configuration of example embodiments is customizable and can be adapted to different ROV sizes and task requirements. Specifically, users can receive different patterns of augmented feedback by changing positions of vibrating modules. This means that an operator can adjust the suit's sensitivity and feedback levels to provide optimal performance for each specific ROV and task.

The haptic suit of example embodiments described herein incorporates a flexible and adjustable base structure that can be constructed of lightweight and durable materials, such as high-strength fabric or polymer composites. The structure can be designed to provide a comfortable fit for users of various body sizes and shapes. FIG. 3 illustrates an example embodiment of a haptic suit worn over the torso of an operator. As shown, the front of the haptic suit 310 includes 46 mounting bases or locations where vibrating modules can be mounted. The illustrated depiction includes vacant mounting bases 312 (hollow circles) that lack vibrating modules, and vibrating modules 314 (solid circles) attached to other mounting bases. The back 320 of the haptic suit is similarly configured for a total of 92 mounting bases available for vibrating modules. FIG. 3 also depicts the approximate positioning of the vibrating modules 314 and vacant mounting bases 312 as worn on an operator on the right side of the figure.

The base structure of the haptic suit of an example embodiment is designed to fit the natural contours of the human body. This can include features such as adjustable straps, stretchable panels, or padding located in strategic areas to ensure a secure fit and even distribution of pressure across the operator's body. The design may also incorporate ventilation zones or mesh panels to improve airflow and reduce heat build up during extended use. The base structure of the haptic suit can be equipped with standardized attachment points, such as screw threads, snap-fit connections, or magnetic attachment mechanisms. These attachment points are strategically placed on the front and back sides of the suit allowing users to easily install, remove, or reposition the vibrating modules based on their specific needs.

Each mounting base is an attachment point for attachment of a vibrating module. According to some embodiments, each attachment point is associated with a particular position of a wearer of the haptic suit. The attachment point may inform a vibrating module attached to that particular attachment point of the particular position of the wearer. For example, the attachment point may be configured with a readable code (e.g., barcode, QR code, etc.) that provides an indication of that particular attachment point's position. That readable code can be read, such as by the vibrating module or by a reader that is used when the vibrating module is attached to the attachment point, to correlate the vibrating module with the attachment point to which it is mounted. Optionally, the attachment points may have NFC (near-field communication) devices, such as RFID (radio frequency identification) for identifying to a vibrating module a relative position on the wearer. The relative position of the attachment point to which a vibrating module is attached can be communicated with a controller such that the controller knows when to activate, deactivate, or change the intensity or frequency of vibration of that particular vibrating module.

The mounting bases 312 are carefully positioned to cover essential areas of the operator's torso, allowing for precise and effective tactile feedback. The bases are designed as standardized attachment points, such as screw threads, snap-fit connections, or magnetic attachment mechanisms, to facilitate the effortless installation and removal of the vibrating modules. The placement of these bases is based on human anatomy and kinesthetic perception, ensuring that the vibrating modules can deliver tactile feedback effectively, regardless of their particular configuration. This strategic placement guarantees that the vibrating modules are optimally positioned to provide the user with the most realistic and immersive experience possible.

In order to accommodate a variety of body sizes and shapes, the base structure of the haptic suit should offer a range of adjustability options. This can include adjustable straps or belts, Velcro closures, or elastic components that enable a secure and comfortable fit. Haptic suits of some embodiments may also incorporate modular sizing, allowing users to add or remove sections of the base structure to customize the fit according to their body dimensions. By providing multiple adjustability options, the haptic suit can be adapted to fit a wide range of users, ensuring maximum comfort and effectiveness of the tactile feedback. This flexibility also makes the haptic suit suitable for a variety of applications, as it can be adjusted to accommodate the specific needs of different tasks and environments.

To achieve optimal functionality and user experience, the base structure of the haptic suit must be designed with seamless integration of its mechanical, electrical, and communication components. This includes incorporating channels or compartments for routing wires, embedded microcontrollers, or wireless communication modules. Proper integration of these components ensures a clean and uncluttered design, minimizing the risk of damage to internal components and improving the durability and reliability of the haptic suit. By integrating these components effectively, the haptic suit can provide seamless tactile feedback to the user, enhancing their overall experience. This design approach also enables easy access and maintenance of the internal components, facilitating any necessary repairs or upgrades.

The vibrating modules 314 play a crucial role in the configurable haptic feedback as they are responsible for generating the whole body coverage haptic feedback to indicate complex hydrodynamic features of the ROV working environment. The vibrating modules can include a motor to generate vibrations felt by the operator. Embodiments can employ one or both of two types of motors, namely the Linear Resonant Actuator (LRA) and Eccentric Rotating Mass (ERM) motor. LRA motors are comprised of a mass attached to a spring, driven by a voice coil actuator. When an alternating current (AC) is applied, the mass vibrates at its resonant frequency, resulting in highly precise and responsive vibrations. They are characterized by their low power consumption, fast response times, and wide frequency range, making them ideal for delivering high-fidelity tactile feedback. On the other hand, ERM motors consist of a small, off-center mass attached to the shaft of a DC motor. When the motor rotates, the imbalance caused by the off-center mass generates vibrations. ERM motors are simpler in design, usually more affordable, and easier to integrate into the haptic suit. However, they may have slower response times and lower precision when compared to LRAs. By incorporating both LRA and ERM motors into the vibrating modules of the haptic suit, users can experience a range of tactile feedback options. The LRA motors provide high precision and responsiveness, while the ERM motors offer a more affordable and easier-to-integrate option. The selection of motor type can be customized based on specific task requirements and user preferences.

The motor of example embodiments can be shielded by a housing to safeguard it against environmental factors, such as dust, moisture, or impact. The housing may be formed from lightweight materials, such as plastic or aluminum, and may incorporate features such as ventilation to dissipate heat, noise reduction, or mounting points for attachment to the haptic suit. The vibrating module of an example embodiment includes a mounting interface that facilitates its effortless attachment or detachment from the bases on the haptic suit. The interface could be designed with screw threads, snap-fit connections, or a magnetic attachment mechanism, depending on the specific requirements of the haptic suit's design. This interface ensures a secure attachment of the vibrating modules, while allowing users to tailor their haptic feedback by repositioning the modules.

To establish a connection between the vibrating modules and the embedded microcontroller, either electrical wiring or a flexible printed circuit (FPC) can be used. This connection enables the microcontroller to regulate the motor's functioning, controlling its vibration frequency, intensity, and duration based on the hydrodynamic features. Furthermore, the connection can include data lines for monitoring the motor's performance, such as temperature or current consumption, which can aid in refining the haptic feedback and ensuring safe operation.

In order to optimize the performance of the vibrating modules and improve the overall user experience, it is crucial to minimize the transmission of vibrations to the haptic suit's structure and other modules. This can be accomplished by integrating damping materials such as silicone or rubber into the module's design, which can absorb or dissipate vibrations. Additionally, isolation techniques like suspension systems or flexible mounts can be employed to prevent unwanted vibrations from affecting the user's experience. By minimizing the transmission of vibrations, the haptic feedback can be more precise and effective, enhancing the user's immersion and engagement.

Each vibrating module of an example embodiment is connected to an embedded microcontroller within the haptic suit, which receives data about flow conditions and translates it into corresponding vibration patterns for the vibrators. These microcontrollers can be programmed based on different ROV types and task needs, providing versatility and adaptability. The primary function of the embedded microcontrollers is to receive data from the ROV sensors, such as position, orientation, movement, and hydrodynamic features, and use it to generate vibration patterns for the vibrating modules. In addition, the microcontrollers can adjust the vibration intensity, frequency, and duration based on the user's preferences or specific application requirements. Common microcontroller families used in the system include ARM Cortex, Atmel AVR, or Microchip PIC, among others, with the choice of microcontroller depending on factors such as processing power, memory, input/output capabilities, and power consumption.

The embedded microcontrollers of an example embodiment communicate with the ROV teleoperation control system through wireless protocols, such as Bluetooth or Wi-Fi. These communication interfaces enable low-latency data transmission between the robot and the haptic suit, ensuring accurate and responsive tactile feedback. Additionally, the microcontrollers may also support wired communication protocols, such as UART, SPI, or I2C, for connecting to other peripherals or components within the suit.

The haptic suit of some embodiments can be powered by a rechargeable battery pack or a wired connection to a power source. An efficient power management system is implemented to maximize battery life and ensure safe operation. This may include voltage regulators, current limiters, and thermal protection circuits.

The haptic suit of example embodiments described herein aims to cater to various users and applications, allowing for a high degree of customization based on individual use case needs. Different use cases may require unique feedback profiles. For example, a feedback profile may be based on the size of the ROV. The haptic suit's feedback profiles can be adjusted to provide a more immersive experience when controlling larger ROVs. For example, the vibrations could be increased in intensity to simulate the feeling of a larger mass moving through the water, and more vibrating modules could be applied to provide detailed information. Conversely, fewer vibrating modules could be used for small size ROV.

The haptic suit feedback profile of example embodiments can be based on the task needs. The haptic suit can be customized to provide different types of feedback based on the task requirement. For example, when performing a delicate operation such as manipulating small objects or making fine adjustments to the ROV's position, the suit's feedback could be reduced in intensity and increased in precision to provide the user with a more subtle tactile sensation. For routine navigation and inspection, the number of vibrating modules could be reduced because these tasks do not require such high precision of haptic feedback.

The haptic suit feedback profile of example embodiments can be customized based on user preferences. The haptic suit can be configured to allow users to customize their feedback profiles based on personal preferences. For example, users could adjust the intensity, frequency, or duration of the vibrations to match their preferred levels of feedback. Additionally, the suit could allow users to choose between different feedback modes, such as continuous vibrations or short bursts, to better suit their preferences and needs.

In addition to the ability to customize a feedback profile, users can reconfigure the haptic suit's vibrating module layout based on their specific needs or a recommended configuration map. This can include removing vibrating modules from less relevant body areas and installing them in more relevant areas, optimizing the tactile feedback experience. To streamline the reconfiguration process, the haptic suit can incorporate easy-to-use attachment mechanisms such as magnetic connections, snap-fit connectors, or twist-lock systems. This allows users to quickly and effortlessly move vibrating modules between different body areas. For users who are unfamiliar with optimal vibrating module configurations, the customization software or smartphone/tablet app can provide step-by-step guidance on reconfiguring the vibrating modules based on their specific use case.

A user interface of the haptic suit, either integrated directly into the suit or accessible via a connected smartphone or tablet application, enables operators to monitor, configure, and adjust various settings related to haptic feedback, fit, and comfort. Users can adjust the intensity, frequency, and duration of vibrations for each individual vibrating module, creating a personalized feedback profile that caters to their specific needs and preferences. The user interface may provide options to adjust the suit's fit and comfort, such as tightening or loosening straps, modifying padding, or altering the positioning of the vibrating modules.

The ROV controlled by the operator wearing the haptic suit described herein can employ sensors that sense various aspects of the environment and provide that feedback to the operator via the haptic suit. The ROV of an example embodiment, as shown in FIG. 4, includes a frontal array of twelve sensors (shown as upper-front sensors 412, mid-front sensors 414, and lower-front sensors 416) and a rear array of twelve sensors (shown as upper-rear sensors 422, mid-rear sensors 424, and lower-rear sensors 426). FIG. 4 further illustrates sensors wrapping around to the sides of the ROV. These sensors can correspond to the sides of the front and back sensor arrays of FIG. 3. For example, sensors on a front, right side of an ROV shown as shaded sensors 430 can correspond to sensors on a front, right of a wearer of the vibratory sensor array. The positions of sensors on the ROV can correspond generally to sensors of a haptic suit, such that water current pressing against a front of the ROV may be felt through vibrating modules on the front of the haptic suit.

According to the illustrated embodiment, in total, there are twelve virtual sensors on each side of the ROV to trigger the vibrating modules of the haptic suit. The haptic suit will vibrate based on the flow intensity parameters sent by virtual sensors. At the same time, human operator can sense the micro-turbulence via the haptic gloves. With vibrating intensity changing on both sides of the human body, operators can easily sense the hydrodynamic changes and reactively maneuver ROV for other tasks. Embodiments may employ a dynamic collision detector, PxParticleFlag::eCOLLISION_WITH_DYNAMIC, to examine whether a particle collided with the dynamic rigid body (i.e., the virtual ROV model) during the last simulation step. Then two methods from PhysX are used to read position and velocity information, including PxParticleReadDataFlag::ePOSITION_BUFFER and PxParticleReadDataFlag::eFLAGS_BUFFER According to some embodiments, the flow intensity representation generated in DT may not be directly used for triggering the haptic suit. The haptic intensity should not be too intense, otherwise human operator may feel uncomfortable due to the strong vibrations. The vibration may be limited, such as an upper limit for the vibration of about 1.5 cm/s^2. For flow intensity, the values could be varied from 1 to 300. Aimed to convert flow intensity to the identified haptic intensity range, a formula was developed to adjust the values as Eq. 12:

$$\text{Intensity} = \frac{e^{F_{sensor}} - 1}{e^{F_{sensor}} + 1} + \frac{h - h_{min}}{2(h_{max} - h_{min})} \qquad \text{Eq. 12}$$

The term $$\frac{e^{F_{sensor}} - 1}{e^{F_{sensor}} + 1}$$

is for discounting the large range of the raw flow intensity to a range of 0 to 1 for haptic intensity, where $F_{sensor}$ represents the flow intensity sent by the sensors. The term $$\frac{h - h_{min}}{2(h_{max} - h_{min})}$$

is a representation of subsea hydro pressure, where h is the subsea depth of the ROV, h min is the minimum subsea depth of workplace, and $h_{max}$ is the maximum subsea depth of workplace. The subsea hydro pressure of an example embodiment is converted into a range of 0 to 0.5, which ensures the final haptic suit vibration intensity would not be larger than 1.5 cm/s^2.

For micro-field haptic stimulation, a haptic glove device such as HaptX can be used to generate micro-turbulence haptics. As mentioned, HaptX is a pneumatic haptic glove with air channels to deliver high resolution and high displacement tactile feedback. Other examples can use a VR glove with inflatable plastic pads arranged to fit the wearer's palm and generate force feedback. These devices have improved tactile feedback accuracy and can extend Human-VR interaction. Human operators wearing the haptic gloves can move their hands to where they want to perceive minor hydrodynamic changes at micro-level. Micro-scale turbulence data is sent to haptic glove actuators, where palm-level haptics are generated for human operator. There are two main advantages of this multi-level design. On one hand, accurate and high-fidelity hydrodynamic features are required for specific ROV tasks, such as docking, and underwater inspection in an environment with many obstacles. Lack of accurate and high-resolution turbulence information may undermine human perception of the potential danger, resulting in improper decision-making and failure of collision avoidance. On the other hand, too much information could induce cognitive load and mental fatigue. For example, for simple inspection and routine navigation tasks, such kind of micro-scale turbulence information is of no use to send to human operator. With haptic gloves and multi-level design, human operator can decide when to use what levels of sensation (far field, near field and micro-level), based on the task context.

Haptic feedback can be employed in example embodiments described herein where changes of average intensity values generated on the haptic suit zones provide feedback to an operator regarding the workspace environment. For example, for forward operation in static flow, a significantly higher vibration intensity is provided in front channels of a body worn haptic suit. Wave intensity in the middle channels on the back may be difficult for an operator to sense. For example, for the up operation with a 45-degree backward flow, there is not such a significant intensity difference front to back in terms of haptic feedback, but a higher value of intensity is observed in the upper channels in general. For the forward operation with the backward flow, channels on the back provide higher intensity than those on the front. If flow speed was lower from a backward flow or if the ROV navigated faster, higher intensity values may be observed in the front channels. According to example embodiments described herein, there is a significant difference in vibration patterns for different operations and flow conditions, such that the haptic feedback described herein is an effective way of using haptics transferring underwater hydrodynamic conditions. Embodiments enable operators to easily identify different ROV positions and locomotion conditions based on the information provided by the multi-level sensory feedback system, which aides understanding of ROV work status and thus engage in the most proper control operations in future diverse and complex work environments.

Embodiments described herein provide an innovative system for the intuitive teleoperation of subsea ROVs with VR and haptic simulation. Multi-level sensory data from ROV is collected and sent to a digital twins simulation environment for data augmentation. Three types of sensory augmentation methods, namely far-field augmented visual feedback, near-field haptic suit feedback and micro-field haptic glove feedback, are generated to enhance human situational awareness of ROV workspace with higher efficiency. This VR-Haptic integrated environment immerses human operator in a high-fidelity sensory stimulation system, streamlining the HRC workflow. As a result, human operator can easily sense the state of ROV through visual and haptic channels and issue adequate control commands in an intuitive way. This leads to the increased situational awareness of human operator, improvement to the training effectiveness of ROV operators, and the enablement of future engineers to enter a subsea era in a safer, less costly way. By integrating multi-levels of sensory information and feedback, embodiments described herein provide an immersive and interactive control system for future ROV operations.

By using body gesture control, traditional joystick control is not needed thereby freeing human operator's hands from the control tasks. Joystick control methods conflict with the micro-field haptic glove sensation method to some extent, and a more natural body motion and gesture tracking benefits the operation by providing a more immersive and effective control mechanism. Neurophysiological sensors can be used to assess the functions and performance of a human operator during ROV operation using embodiments described herein. By integrating the robot control systems with the Unity engine, VR-Haptic-assisted ROV teleoperation is performed in a participatory and inclusive way. With the increasing adoption of VR and haptic methods, the enhanced sensory feedback helps operators manage complex underwater tasks with relative ease.

FIG. 5 is a schematic diagram of an example of a controller 520 that may be used to control an ROV remotely as described herein. The controller 520 may include or otherwise be in communication with a processor 522, a memory 524, a communication interface 526 and a user interface 528. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 522 (and/or co-processors or any other processing circuitry assisting or otherwise associated with the processor) may be in communication with the memory 524 via a bus for passing information among components of the apparatus. The memory 524 may include, for example, one or more volatile and/or non-volatile memories. In other words, for example, the memory 524 may be an electronic storage device (e.g., a computer readable storage medium) comprising gates configured to store data (e.g., bits) that may be retrievable by a machine (e.g., a computing device like the processor). The memory 524 may be configured to store information, data, content, applications, instructions, or the like for enabling the haptic feedback device 530 to carry out various functions in accordance with an example embodiment of the present disclosure. For example, the memory 524 could be configured to buffer input data for processing by the processor 522. Additionally or alternatively, the memory device could be configured to store instructions for execution by the processor, such as for controlling the ROV as described herein.

The processor 522 may be embodied in a number of different ways. For example, the processor 522 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor 522 may include one or more processors configured in tandem via the bus to enable independent execution of instructions, pipelining and/or multithreading. The processor may be embodied as a microcontroller having custom bootloader protection for the firmware from malicious modification in addition to allowing for potential firmware updates.

In an example embodiment, the processor 522 may be configured to execute instructions stored in the memory 524 or otherwise accessible to the processor 522. Alternatively or additionally, the processor 522 may be configured to execute hard coded functionality. As such, whether configured by hardware or software methods, or by a combination thereof, the processor 522 may represent an entity (e.g., physically embodied in circuitry) capable of performing operations according to an embodiment of the present disclosure while configured accordingly. Thus, for example, when the processor 522 is embodied as an ASIC, FPGA or the like, the processor 522 may be specifically configured hardware for conducting the operations described herein. Alternatively, as another example, when the processor 522 is embodied as an executor of software instructions, the instructions may specifically configure the processor 522 to perform the algorithms and/or operations described herein when the instructions are executed. However, in some cases, the processor 522 may be a processor of a specific device (e.g., a head-mounted display for augmented reality or virtual reality control of the ROV) configured to employ an embodiment of the present disclosure by further configuration of the processor 522 by instructions for performing the algorithms and/or operations described herein. The processor 522 may include, among other things, a clock, an arithmetic logic unit (ALU) and logic gates configured to support operation of the processor 522. In one embodiment, the processor 522 may also include user interface circuitry configured to control at least some functions of one or more elements of the user interface 528.

The communication interface 526 may include various components, such as a device or circuitry embodied in either hardware or a combination of hardware and software that is configured to receive and/or transmit data for communicating instructions to a robot. In this regard, the communication interface 526 may include, for example, an antenna (or multiple antennas) and supporting hardware and/or software for enabling communications wirelessly. Additionally or alternatively, the communication interface 526 may include the circuitry for interacting with the antenna(s) to cause transmission of signals via the antenna(s) or to handle receipt of signals received via the antenna(s). For example, the communication interface 526 may be configured to communicate wirelessly such as via Wi-Fi (e.g., vehicular Wi-Fi standard 802.11p), Bluetooth, mobile communications standards (e.g., 3G, 4G, or 5G) or other wireless communications techniques. In some instances, the communication interface may alternatively or also support wired communication, which may communicate with a separate transmitting device (not shown). As such, for example, the communication interface may include a communication modem and/or other hardware/software for supporting communication via cable, digital subscriber line (DSL), universal serial bus (USB) or other mechanisms. For example, the communication interface 526 may be configured to communicate via wired communication with other components of a computing device.

The user interface 528 may be in communication with the processor 522, such as the user interface circuitry, to receive an indication of a user input and/or to provide an audible, visual, mechanical, or other output to an operator. As such, the user interface 528 may include, for example, one or more buttons, light-emitting diodes (LEDs), a display, a head mounted display (virtual reality headset and augmented reality headset), a joystick, a speaker, and/or other input/output mechanisms. The user interface 528 may also be in communication with the memory 524 and/or the communication interface 526, such as via a bus. The user interface 528 may include an interface with the robot to provide operator instructions to the robot while receiving feedback from the robot. The user interface 528 optionally includes body motion trackers equipped in the haptic feedback system to control movement of the ROV. The body motion trackers of such a user interface 528 can include accelerometers and/or inertial measurement units (IMUS) to sense the gesture change of the body of an operator. The tracked body gesture changes can control movement of the ROV, such as through moving forward, moving backward, turning left, turning right, etc.

The communication interface 526 may facilitate communication between the ROV, the user interface 528, and the haptic feedback device 530. The communication interface 526 may be capable of operating in accordance with various wired and wireless communication protocols. The controller may optionally include or be in communication with the haptic feedback device 530. The haptic feedback device may include various sensors or devices configured to provide haptic sensation to an operator of the ROV. In an example embodiment described above, the haptic feedback device 530 is a body worn device including an array of sensors across the front of an operator's body and an array of sensors across the back of an operator's body. These sensors may be, for example, vibratory sensors. Optionally, sensors may be configured to provide temperature sensations to an operator. The haptic feedback device of example embodiments is detailed below for use with teleoperation and control of a robot, such as the ROV described herein.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for robot teleoperation comprising:

an underwater robot vehicle;

a subsea sensing module associated with the underwater robot vehicle;

a workplace module; and a user interface, wherein the subsea sensing module senses hydrodynamic features and temperatures of an environment of the underwater robot vehicle and provides sensor data to the workplace module, wherein the hydrodynamic features sensed by the subsea sensing module include near-field water flow, wherein the workplace module reproduces the environment and instructs the user interface to provide sensory augmentation associated with the environment including the near-field water flow to an operator, wherein the subsea sensing module comprises a lateral-line sensory mechanism of hair like cells throughout a sensing module surface, wherein the hair like cells are configured to detect pressure gradients and shear stress of the environment.

2. The system according to claim 1, further comprising:

a robot control module, wherein the user interface receives input from the operator and the robot control module controls the underwater robot vehicle according to the input.

3. The system according to claim 2, wherein the user interface receives input in as body gestures of the operator, wherein the robot control module controls the underwater robot vehicle according to the body gestures of the operator.

4. The system according to claim 1, wherein the user interface provides haptic feedback to the operator indicative of the hydrodynamic features of the environment of the underwater robot vehicle including the near-field water flow.

5. The system according to claim 4, wherein the hydrodynamic features include water currents affecting the underwater robot vehicle.

6. The system according to claim 1, wherein the user interface comprises:

a body-worn haptic feedback garment comprising a first sensor array disposed across a front side of the operator and a second sensor array disposed across a back side of the operator, wherein the body-worn haptic feedback garment provides haptic feedback to the operator reflecting a position and orientation of the underwater robot vehicle.

7. The system according to claim 6, wherein the body-worn haptic feedback garment provides haptic feedback to the operator reflecting hydrodynamic features of the environment of the underwater robot vehicle.

8. The system according to claim 7, wherein the user interface further comprises:

a virtual reality headset worn by the operator, wherein the virtual reality headset provides a visual indication of the environment of the underwater robot vehicle.

9. The system according to claim 7, wherein the first sensor array comprises vibratory sensors, wherein the second sensor array comprises vibratory sensors, wherein the first sensor array comprises a series of rows and columns of vibratory sensors and the second sensor array comprises a series of rows and columns of vibratory sensors.

10. The system of claim 1, wherein the subsea sensing module comprises:

at least one sensor to sense far field hydrodynamic information; and at least one sensor to sense near field hydrodynamic information.

11. The system of claim 10, further comprising at least one sensor to sense micro field hydrodynamic information, wherein far field hydrodynamic information ranges from three meters to twenty meters from the underwater robot vehicle, near field hydrodynamic information ranges from a tenth of a meter to three meters from the underwater robot vehicle, and wherein micro field hydrodynamic information is within a tenth of a meter of the underwater robot vehicle.

12. The system of claim 10, wherein the at least one sensor to sense far field hydrodynamic information comprises an acoustic Doppler current profiler to collect underwater wave profiles.

13. The system of claim 1, wherein the subsea sensing module comprises an array of pressure sensors embedded within an elastomer to measure hydrodynamic forces exerted on the underwater robot vehicle.

14. A method for robot teleoperation comprising:

receiving, at a workplace module, sensor data from a subsea sensing module associated with an underwater robot vehicle, wherein the sensor data includes characteristics of a subsea environment including near-field water flow, wherein the subsea environment is sensed via subsea sensing module of the underwater robot vehicle, the subsea sensing module comprising a lateral-line sensory mechanism of hair like cells throughout a sensing module surface, wherein the hair like cells are configured to detect pressure gradients and shear stress of the environment; and generating, at the workplace module, instructions for a user interface, wherein the instructions provide sensory augmentation to an operator of the underwater robot vehicle through the user interface replicating the subsea environment including the near-field water flow.

15. The method according to claim 14, further comprising:

receiving input from the user interface from the operator; and controlling, via a robot control module, the underwater robot vehicle wherein the input from the user interface comprises body gesture input, wherein the body gesture input causes movement of the underwater robot vehicle.

16. The method according to claim 14, wherein the sensory augmentation to the operator of the underwater robot vehicle through the user interface is provided as haptic feedback, wherein the haptic feedback is indicative of hydrodynamic features of the subsea environment of the underwater robot vehicle.

17. The method according to claim 14, wherein generating, at the workplace module, instructions for the user interface comprises generating, for the user interface using at least one of a game engine or a physics engine, haptic feedback instructions for the user interface based on the sensor data from the subsea sensing module associated with the underwater robot vehicle.

18. The method according to claim 17, further comprising:

generating, at the user interface, haptic feedback for the operator based on the haptic feedback instructions, wherein the haptic feedback provides simulation of the subsea environment of the underwater robot vehicle.

19. The method according to claim 18, wherein the simulation of the subsea environment of the underwater robot vehicle comprises simulation of hydrodynamic properties of the subsea environment of the underwater robot vehicle.

* * * * *